United States Patent
Piccardi et al.

(10) Patent No.: US 11,652,409 B2
(45) Date of Patent: *May 16, 2023

(54) STAGE PROTECTION IN MULTI-STAGE CHARGE PUMPS

(71) Applicant: Micron Technology, Inc., Boise, ID (US)

(72) Inventors: Michele Piccardi, Cupertino, CA (US); Xiaojiang Guo, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,264

(22) Filed: Apr. 25, 2022

(65) Prior Publication Data
US 2022/0247308 A1 Aug. 4, 2022

Related U.S. Application Data

(63) Continuation of application No. 17/093,167, filed on Nov. 9, 2020, now Pat. No. 11,323,027, which is a continuation of application No. 16/222,041, filed on Dec. 17, 2018, now Pat. No. 10,833,580.

(51) Int. Cl.
*H02M 3/07* (2006.01)
*H02M 1/32* (2007.01)

(52) U.S. Cl.
CPC ............... *H02M 3/07* (2013.01); *H02M 1/32* (2013.01)

(58) Field of Classification Search
CPC .......... H02M 3/07; H02M 1/32; H02M 1/322; H02M 3/073; G11C 5/145
See application file for complete search history.

(56) References Cited

U.S. PATENT DOCUMENTS

| | | | |
|---|---|---|---|
| 6,204,129 B1 | 3/2001 | Hwang et al. | |
| 10,833,580 B2 | 11/2020 | Piccardi et al. | |
| 11,323,027 B2* | 5/2022 | Piccardi | H02M 1/32 |
| 2010/0166229 A1 | 7/2010 | Pennock et al. | |
| 2012/0007501 A1 | 3/2012 | De et al. | |
| 2018/0314284 A1 | 11/2018 | Morris, III et al. | |
| 2020/0195134 A1 | 6/2020 | Piccardi et al. | |
| 2021/0057993 A1 | 2/2021 | Piccardi et al. | |

FOREIGN PATENT DOCUMENTS

CN 111327191 6/2020

* cited by examiner

*Primary Examiner* — Metasebia T Retebo
(74) *Attorney, Agent, or Firm* — Schwegman Lundberg & Woessner, P.A.

(57) ABSTRACT

Apparatus, systems, and methods are disclosed, including a high-voltage charge pump including multiple pump stages connected in series to provide a high-voltage output, a common discharge circuit, and multiple high-voltage devices coupled between the outputs of each of the multiple pump stages and the common discharge circuit. Each of the multiple pump stages include a low-voltage switching device. The common discharge circuit is coupled to each of the multiple pump stages and is configured to discharge the multiple pump stages when the multiple pump stages are disabled. The multiple high-voltage devices include a respective high-voltage device coupled between an output of each of the multiple pump stages and the common discharge circuit.

21 Claims, 7 Drawing Sheets

STAGE PROTECTION IN MULTI-STAGE CHARGE PUMPS

PRIORITY APPLICATION

This application is a continuation of U.S. application Ser. No. 17/093,167, filed Nov. 9, 2020, which is a continuation of U.S. application Ser. No. 16/222,041, filed Dec. 17, 2018, now issued as U.S. Pat. No. 10,833,580, all of which are herein incorporated by reference in their entirety.

BACKGROUND

Memory devices commonly use charge pumps to convert an input voltage to a suitable operational voltage for performing one or more operations within the memory device. Some memory devices require relatively high voltages for specific memory operations. For example, flash memory devices can require voltages greater than 12 volts (e.g., up to 30 volts or more) for specific memory operations, such program or erasure of memory cells. In some conventional charge pumps, a high-voltage output charge pump to provide such voltage may include multiple low-voltage stages. Although a variety of specific configurations are known in the art, generally such charge pumps include multiple serially-connected stages, with each stage including (in simplified form) a diode and a capacitor, wherein the capacitor is charged and discharged in response to a clock signal. The charge pump progressively stores more charge on the capacitor of each successive stage to achieve the desired voltage output.

In multi-stage charge pumps, individual stages may retain capacitive charge even when the charge pump and/or stage are not active. This retained capacitive charge can be detrimental to the life of the components of the stage, for example, by imposing stress or damage to dielectric in circuit components of the stage. These effects can be exacerbated by manufacturing challenges in forming relatively thin dielectric layers required for low-voltage circuitry in the charge pump stages.

Both low-voltage and high-voltage devices (e.g., transistors, other semiconductor components, etc.) typically include one or more dielectric layers, such as a silicon dioxide layer or one or more other dielectric or oxide layers. Devices are commonly rated for a limited voltage that may be safely applied across the dielectric layer, with estimated time-to-failure increasing exponentially with the voltage applied across the dielectric layer. Accordingly, the voltage applied across the dielectric layer should be managed to avoid damaging the device and to ensure industry standard reliability specifications.

Low-voltage devices are rated for relatively small voltages. Existing low-voltage devices commonly have voltage thresholds of 4 volts or less. In certain examples, the term "low voltage" is relative to voltage thresholds of similar, higher-voltage devices. Existing high-voltage devices commonly have voltage thresholds greater than 4 volts, and often substantially greater, such as 30 volts or more. As technology advances, such terms will evolve.

Dielectric layers (e.g., a silicon dioxide layer) in a low-voltage device are thinner than corresponding layers in a similar, high-voltage device. The relatively thinner dielectric layer of low-voltage devices has a smaller voltage threshold that may be safely applied across the dielectric layer. Voltages above this threshold applied across the dielectric layer may damage such layers or devices and may decrease the time-to-failure for the device. Accordingly, for safe operation, voltages across the dielectric layer should be less than the threshold for low-voltage devices.

High-voltage devices have thicker dielectric layers, in contrast to low-voltage devices, which allow high-voltage devices to operate with higher voltages applied across the dielectric layer. For example, high-voltage devices may safely operate at 30 volts. High-voltage devices tend to be larger, less conductive, and slower than low-voltage devices. Accordingly, low-voltage devices may be preferred for performance of analog, digital, and mixed signal applications. Low-voltage devices, however, are not typically used within high-voltage devices, such as charge pumps, due to the strict control requirements of voltages over the dielectric layer of the low-voltage device to ensure safe operation. Using low-voltage devices for some components in analog and/or mixed signal applications, such as charge pumps, would provide performance and/or efficiency benefits in such applications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
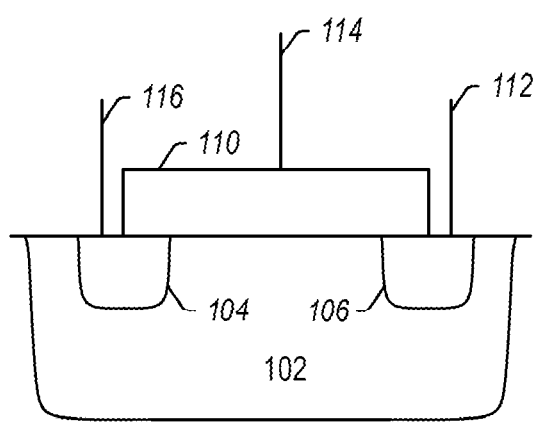
FIG. 1 illustrates an example device including a dielectric layer.

The present inventors have recognized, among other things, techniques, and methods to protect low-voltage devices of a multi-stage circuit using a discharge device. In an example, the multi-stage circuit can include a charge pump and the low-voltage devices can include a transistor. In certain examples, protecting low-voltage stages of a multi-stage circuit can enable the multi-stage circuit to provide a relatively high voltage output in contrast to the separate tolerances of the individual stages, such as one or more high-voltage outputs for one or more semiconductor device operations (e.g., programming/erasing memory cells of a nonvolatile memory device, etc.). In other examples, the multi-stage circuits can include one or more other multi-stage circuits, such as an amplifier, an analog-to-digital converter (ADC), a digital-to-analog converter (DAC), or one or more other multi-stage circuits, and the low-voltage devices can include one or more other two or three-terminal devices, such as diodes, one or more specific transistors (e.g., field-effect transistors (FETs), complimentary-metal-oxide semiconductor (CMOS) transistors, etc.).

A charge pump is designed to receive an input voltage and provide an output voltage, often higher than the input voltage, when enabled. Charge pumps may include multiple stages, with each stage providing a portion of the output voltage. Typically, each stage includes some capacitance element (e.g., a capacitor) used to store a charge that is used to generate the respective portion of the output voltage. Existing multi-stage charge pumps for high-voltage (HV) applications often require high-voltage devices. The techniques and methods described herein can, among other things, enable the use of low-voltage (LV) devices in the pump stages, in certain examples, providing performance and cost benefits in contrast to high-voltage devices. To ensure that low-voltage devices are not damaged, or that the time-to-failure metric for such devices are not reduced, voltages across one or more dielectric layers of the such devices can be controlled, such as kept below a threshold voltage. In an example, the one or more dielectric layers can include a silicon dioxide layer, one or more other dielectrics or oxide layers can be used.

A charge pump, or one or more pump stages, may be disabled, such that the charge pump or the one or more pump stages do not provide additional voltage at a voltage output. However, once disabled, the charge pump, or the one or more pump stages, may have a remaining charge. For example, charge may remain on one or more capacitance elements of one or more pump stages. In certain examples, the remaining charge can provide unnecessary stress to coupled devices, such as low-voltage devices having dielectric layers with a threshold voltage at, near, or below the remaining charge. In other examples, with different charges remaining within a multi-stage circuit, and stages being enabled and disabled at one or more different voltage levels, if such remaining charge is left within the circuit and not accounted for, unexpected voltage differences can be provided across a dielectric layer of a device at, near, or above the threshold voltage of the dielectric layer, potentially damaging the device. Further, the remaining charge may move in an uncontrolled way through one or more circuits due to leakage. Such movement could create a voltage above the low-voltage threshold across one or more of the low-voltage devices. Accordingly, the remaining charge of the pump stages poses a risk to low-voltage devices within the charge pump.

To address such issues, the present inventors have recognized techniques and methods to remove or reduce remaining charge from a multi-stage circuit using, for example, a discharge device, such as a current source (e.g., a trimmable current source). In an example, when one or more stages of a multi-stage circuit are disabled, a discharge device, such as a trimmable current source or other discharge device, can be enabled to remove stored charge from the one or more disabled stages. In certain examples, a single discharge device can be coupled to each of the multiple stages and enabled when the multi-stage circuit is disabled. In other examples, a single discharge device can be coupled to each of the multiple stages and enabled when one or more of the multiple stages are disabled. In other examples, one or more discharge devices can be coupled to one or more of the multiple stages and enabled when one or more of the multiple stages are disabled. In certain examples, using a single discharge device for the multiple stages can be advantageous from a space, power, and cost perspective. In other examples, multiple discharge devices can be used to provide more robust and controllable protection.

In an example, the discharge device can include a trimmable current source coupled to multiple stages, and which is operable to bleed charge in each of the coupled pump stages to a safe charge level. In an example, a value of the trimmable current source can be set during initial testing or design. In other examples, such trimmable current source can be one of a number of programmable or selectable values (e.g., set with a resistance value, a capacitance value, a voltage level, a selected pin, an instruction, etc.).

In certain examples, the discharge device can include a controllable or dynamic device configured to bleed charge at a rate commensurate with the stored charge remaining in one or more of the multiple stages or remaining in the multiple-stage circuit. The amount of current provided by the trimmable current source may be configured based on the remaining charge of the pump stages after the charge pump provides the output voltage and is disabled. Operation of the discharge device may vary in response to detected conditions, including the performance of the one or more pump stages. In certain examples, discharging the remaining charge is accomplished without impacting the normal functionality of the charge pump or impacting the pump efficiency. In addition, the added circuitry can be relatively small, such that the charge pump does not increase in size compared to charge pumps without the discharge device. In an example, the discharge device can include a current source. The current provided by the discharge device may be variable in response to dynamic conditions of one or more of the multiple stages of the multi-stage circuit.

FIG. 1 illustrates an example low or high-voltage device 100 (e.g., a three-terminal device, such as a transistor, etc.), such as a P-type metal-oxide-semiconductor (PMOS) device, or one or more other three-terminal low or high-voltage devices. The device 100 includes three terminals, including a drain 116, a source 112, a gate 114. Each of the drain 116, the source 112, and the gate 114 can include a conductor, pad, or contact (not illustrated). In other examples, the device 100 can include a two-terminal low or high-voltage device, similar to that illustrated, with two of the three terminals connected (e.g., a source coupled to a gate, etc.), or having only two of the three terminals (e.g., a gate and a drain, a gate and a source, etc.).

The device 100 includes two p-type areas 104, 106, and an n-type area 102 (e.g., an n-type substrate). Other devices, such as an N-type metal-oxide-semiconductor (NMOS) device, can have the n-type and p-type areas reversed. A dielectric layer 110 (e.g., an oxide layer, such as silicon oxide, silicon dioxide, etc.) separates the gate 114 from the n-type area 102, insulating the gate 114 from the one or more other terminals. The thickness of the dielectric layer 110 depends upon, among other things, the voltage the device 100 is designed to withstand, such as between the terminals or different areas of the device 100. A thinner dielectric layer 110 can withstand a lower voltage for safe operation, but is faster, cheaper, and in certain examples, consumes less area than thicker dielectric layers or devices having thicker dielectric layers. In an example, a low-voltage device can be designed to withstand 4 volts. High-voltage devices have thicker oxide layers 110 and therefore, can sustain higher voltage differentials. In an example, a high-voltage device can be designed to withstand 5 volts or more. In certain examples, high voltage devices can be designed to withstand 12 volts, 20 volts, 30 volts, or even hundreds of volts or more.

The terms "low voltage" and "high voltage" are industry terms and can change based on changes in the industry or the applications of the devices. As an example, as devices become smaller (see, e.g., Moore's law), voltage thresholds and power consumption (and waste) in devices are decreasing. The voltage level associated with the term "low voltage" can decrease in time. High and low voltages in charge pump applications may depend on logic levels of associated devices (e.g., control signals, etc.), power supply rails, or the input or output voltage levels of electronic circuits containing such charge pumps. In charge pumps, voltages are commonly amplified in stages, with voltage from a subsequent stage adding to the voltage of previous stages. Low voltage can refer to the voltage in an individual stage, or the voltage levels of associated control signals within the charge pump or logic or processor controlling the charge pump or charge pump stages. High voltage can refer to the output voltage of the charge pump, or the voltage difference across multiple charge pump stages (e.g., higher than the voltage created in an individual stage).

Figure 2:
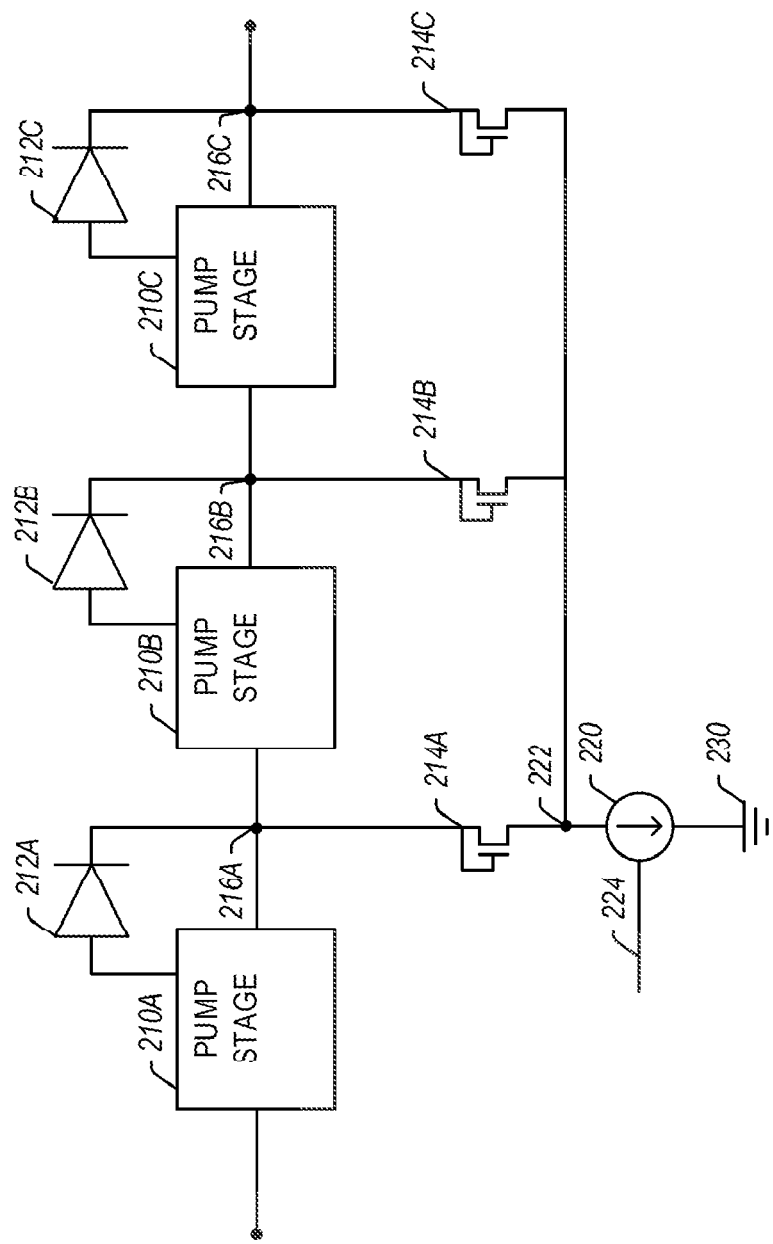
FIG. 2 illustrates an example high-voltage charge pump.

FIG. 2 illustrates an example high-voltage charge pump 200. The charge pump 200 is considered high-voltage since the charge pump produces a voltage that is above the low-voltage threshold and the voltage differential between the input and output terminals of the charge pump may be above the low-voltage threshold. The charge pump 200 includes N pump stages, 210A, 210B, and 210C. The charge pump 200 may include additional pump stages. In other examples, the charge pump 200 may include fewer pump stages. The pump stages 210A, 210B, and 210C are connected in series, such than an output terminal 216A or 216B of one pump stage can be connected to an input of the next pump stage. In this example, an output terminal 216C, from the last pump stage 210C in the illustrated series, is the output terminal of the charge pump 200. Each of these pump stages 210A, 210B, and 210C can include low-voltage devices. When disabled, the charge pump 200 can discharge at least a portion of the remaining charge on the pump stages using a trimmable current source 220.

The trimmable current source 220 can be connected between a common node 222 and a reference terminal 230. In certain examples, the current provided by the trimmable current source 220 is between 100 microamps and 20 milliamps. The reference terminal 230 may be ground or held at another reference voltage. The trimmable current source 220 can be configured to drain at least a portion of the remaining charge from the pump stages 210A, 210B, and 210C. Accordingly, the current source may include a control input 224 configured to receive information to control (e.g., enable/disable, provide a configurable or selectable current, etc.) the trimmable current source 220. The control input 224 may be connected to the input of the charge pump via an inverter, such that the trimmable current source 220 can be enabled when the charge pump is disabled, and disabled when the charge pump is enabled.

The common node 222 can be common to multiple pump stages, and can be connected to the output terminal 216A, 216B, and 216C of each of the pump stages 210A, 210B, and 210C through passive devices (e.g., diodes) 214A, 214B, and 214C. In various examples, the passive devices 214A, 214B, and 214C can include high-voltage devices (e.g., high-voltage diodes). The discharge speed can be based on the size of the passive devices 214A, 214B, and 214C, which may vary across examples to vary the discharge speed.

The discharge speed can be impacted by the amount of current provided by the trimmable current source 220. The provided current, can be controlled to avoid damaging low-voltage devices. The current from the trimmable current source 220 impacts the voltage differential across the dielectric layers in the low-voltage devices in the pump stages 210A, 210B, and 210C. In some examples, the discharge speed can be controlled such that the voltage across the low-voltage devices is less than the low-voltage threshold. The amount of current from the trimmable current source 220 may be selected or configured using a diode transfer curve. Accordingly, in some examples, plotting the remaining charge of the pump stages 210A, 210B, and 210C shows a curve with a smaller slope compared to a more aggressive discharge current that could damage the LV devices. In an example, the maximum safe current for a charge pump can be determined and the trimmable current source 220 can provide the maximum safe current (or less) when enabled. In other words, a slew rate can be controlled using the trimmable current source 220 to ensure the protection of the low-voltage devices.

The high-voltage charge pump 200 can include diodes 212A, 212B, and 212C connected between the output terminals 216A, 216B, and 216C and capacitor nodes within the pump stages 210A, 210B, and 210C. In an example, if a pump stage includes multiple capacitor nodes, the diode for that pump stage may be connected to each capacitor node. In other examples, a pump stage may have one or more diodes with at least one diode connected to each capacitor node. The diodes 212A, 212B, and 212C can help discharge the internal capacitor nodes of the pump stages 210A, 210B, and 210C.

Discharging the pump stages 210A, 2106, and 210C, as described above, can be accomplished such that read and program latencies of a coupled device (e.g., a NAND device configured to receive the output voltage) are not impacted. In addition, the passive devices 214A, 214B, and 214C may not exercise a discharge role when the charge pump is enabled and the trimmable current source 220 is disabled. Further, the diodes 212A, 212B, and 212C can be chosen to minimize current leakage. The number of diodes at each pump stage and the size of the diodes may be selected to ensure that the diodes 212A, 212B, and 212C do not impact the performance of the charge pump. In addition, the diodes 212A, 212B, and 212C do not add significant parasitic capacitance to any internal nodes of the pump stages 210A, 2106, and 210C, which is important to avoid impacting performance of the charge pump. Finally, the additional circuitry (e.g., the trimmable current source 220 and the passive devices 214A, 214B, and 214C, etc.) are relatively small, such that size of the charge pump is not significantly impacted. In some examples, replacing high-voltage devices in existing pump stages with low-voltage devices results in charge pumps without a significant reduction in size.

Figure 3:
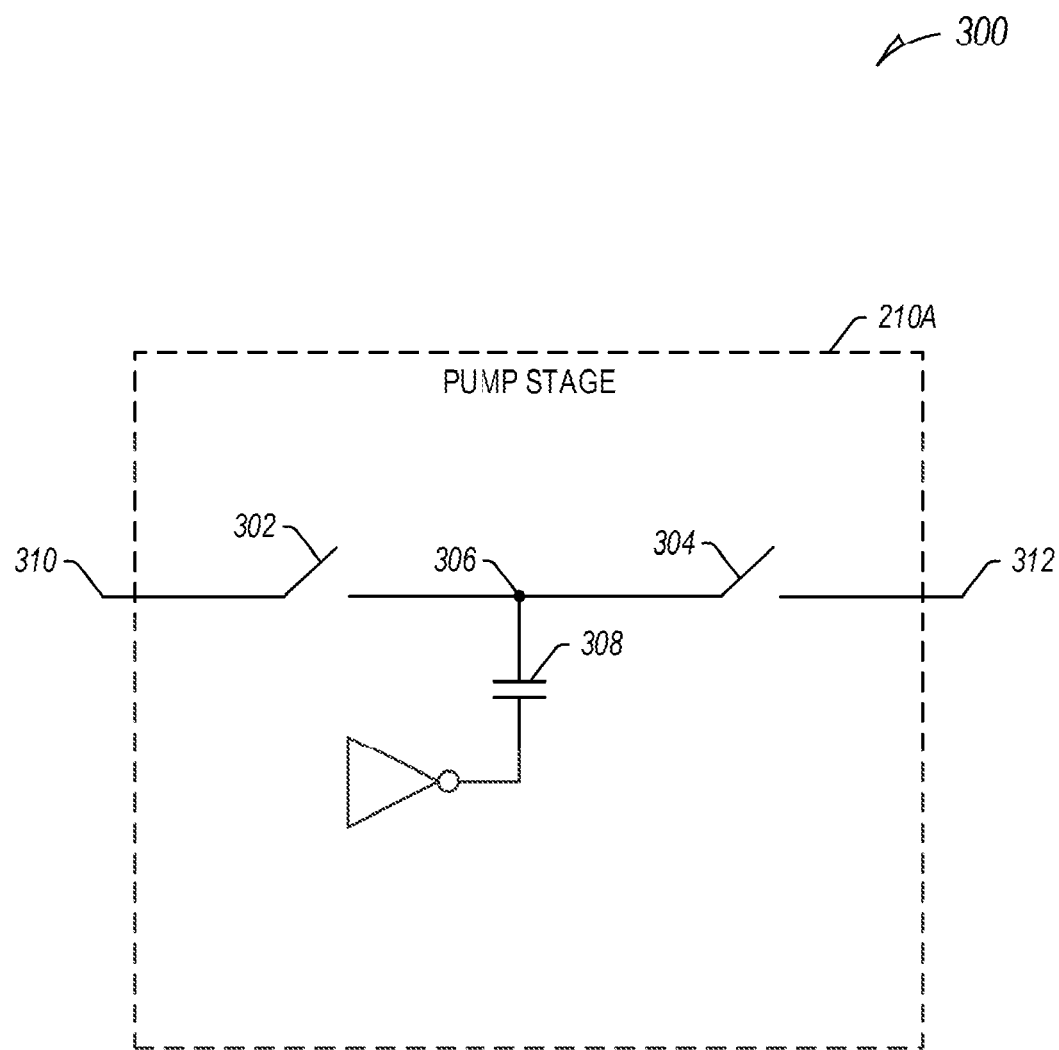
FIG. 3 illustrates an example pump stage of a charge pump.

FIG. 3 illustrates an example pump stage 300 of a charge pump. The illustrated pump stage 300 may be one of the pump stages 210A, 210B, 210C, or 210D from FIG. 2. The pump stage 300 includes an in switch 302 and an out switch 304. The in switch 302, the out switch 304, or both, can be LV devices. The in switch 302 may be closed when the charge pump is enabled. In an example, the in switch 302 can be closed based on a clock edge. Once the in switch 302 is closed, a capacitor 308 can be charged based on a source voltage from an input terminal 310. A capacitor node 306 represents either side of the capacitor 308, and can allow a connected circuit to discharge the capacitor 308. In examples, a single pump stage may include multiple capacitance elements, and therefore, may have multiple capacitor nodes, such as to remove excess or unwanted charge from one or more stages of the charge pump. The out switch 304 may be closed with the in switch 102 or after the in switch 302 has been closed for a time period. When the out switch 304 is closed, the source voltage plus the voltage of the capacitor 308 can be passed through the output terminal 312. The output terminal 312 may connect to another pump stage or be the output terminal for the charge pump.

Figure 4:
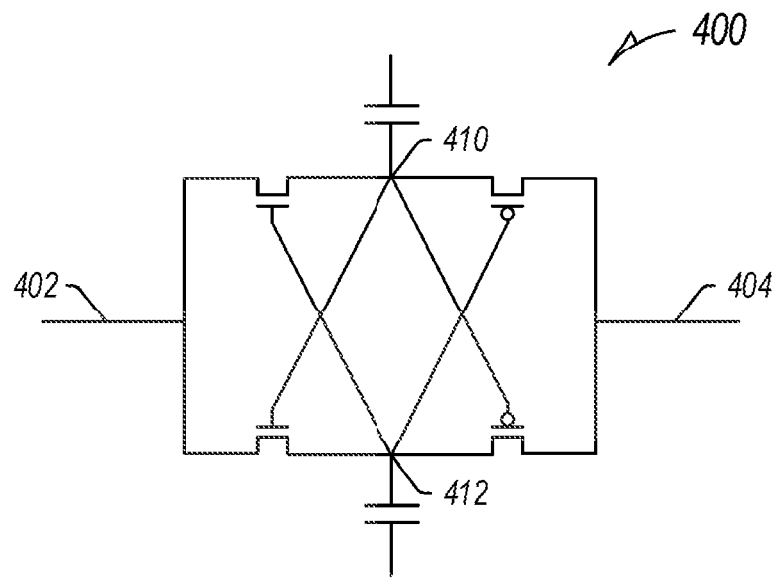
FIG. 4 illustrates an example pump stage.

FIG. 4 illustrates an additional example of a pump stage 400. The illustrated pump stage 400 may be one of the pump stages 210A, 210B, 210C, or 210D from FIG. 2. The pump stage 400 includes an in switch 402 and an out switch 404.

The in switch 402, the out switch 404, or both, can be LV devices. The in switch 402 may be closed when the charge pump is enabled. In an example, the in switch 402 can be closed based on a clock edge. Discharge diodes can be connected at nodes 410 and 412.

Figure 5:
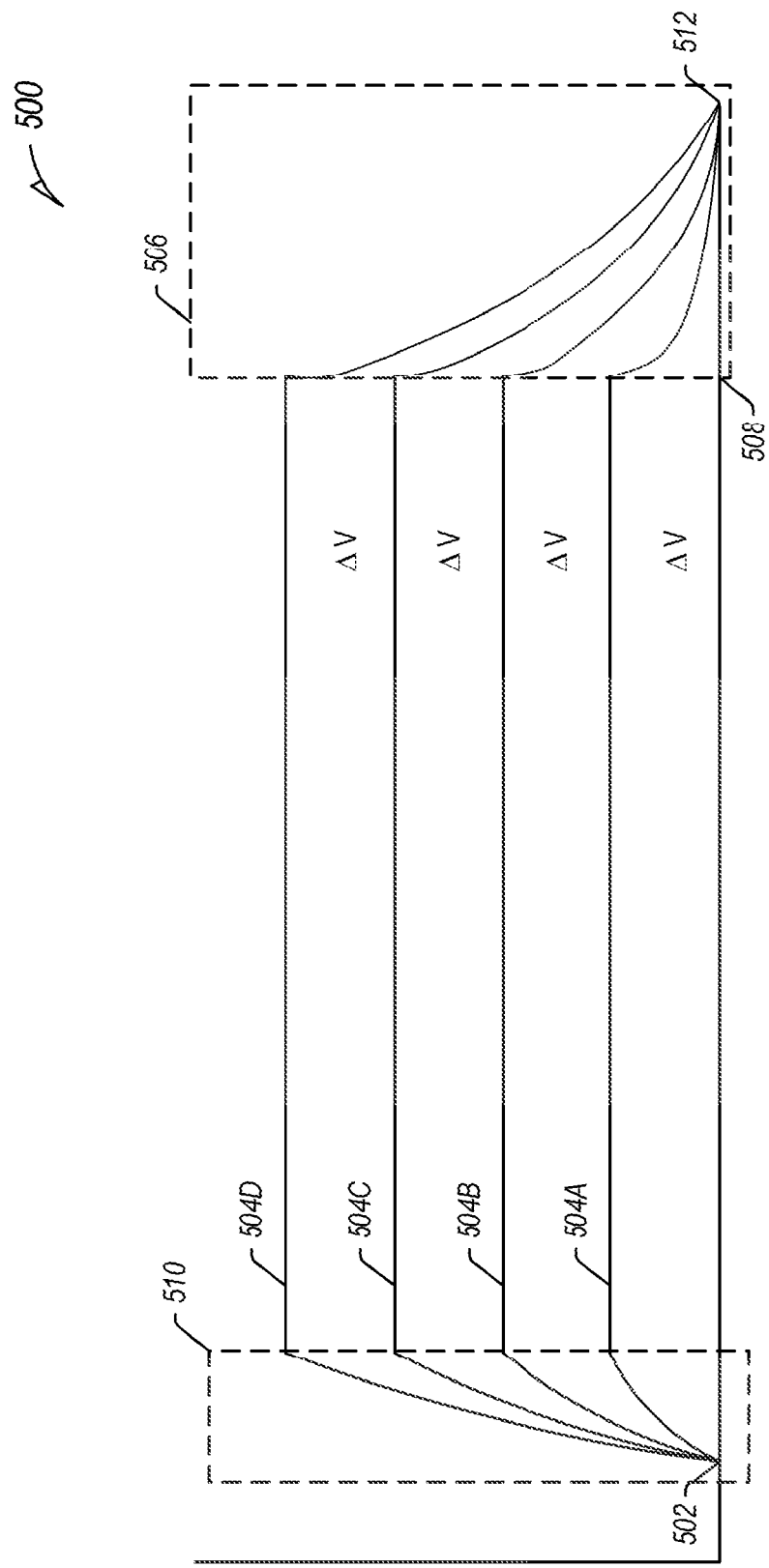
FIG. 5 illustrates an example graph of a voltage trend between pump stages of an N-stage charge pump.

FIG. 5 illustrates an example graph 500 of a voltage trend between pump stages of an N-stage charge pump. The y-axis represents voltage of the output terminal of the charge pump stages and the x-axis is time. In the example graph, the charge pump has four pump stages. Each of the pump stages contribute $\Delta V$ to the output voltage of the charge pump. Accordingly, the charge pump will output $V_{dd}+4*\Delta V$, where $V_{dd}$ is a source voltage applied to a charge pump input terminal.

At 502, the charge pump is enabled. The charge pump may be enabled in various ways, such as based on a clock edge, a voltage applied to an input terminal, etc. During a charge time 510, pump stages charge to their output values. At the end of the charge time 510, the charge pump has reached steady state and the output of the charge pump is at the output voltage. A first pump stage 504A adds $\Delta V$ to the output voltage. Each of the other stages 504B, 504C, and 504D add $\Delta V$ to the output voltage, such that the output voltage of the charge pump is $V_{dd}+4*\Delta V$ at steady state. In certain examples, the voltage differential across the dielectric layer of LV devices within each pump stage can remain below a low-voltage threshold.

At 508, the charge pump is disabled. At 508, each pump stage 504A, 504B, 504C, and 504D have a remaining charge as shown in the graph 500. During a discharge time 506, the pump stages 504A, 504B, 504C, and 504D can be flushed to discharge at least some of the remaining charge. At 512, the pump stages have been discharged. In an example, the charge is reduced to 0. In other examples, the charge is reduced but not eliminated such that each pump stage has a voltage across its terminals. This voltage, however, is configured such that the oxide layer in any low-voltage devices is not compromised. That is, the voltage after discharge is small enough such that, even with leakage, the voltage applied across any oxide layer is below the low-voltage threshold. In such an example operation, wherein the charge within the capacitor is not reduced to zero, the charge time of the charge pump for future cycles may be reduced since the pump stages are starting at a voltage closer to the $\Delta V$ voltage.

Figure 6:
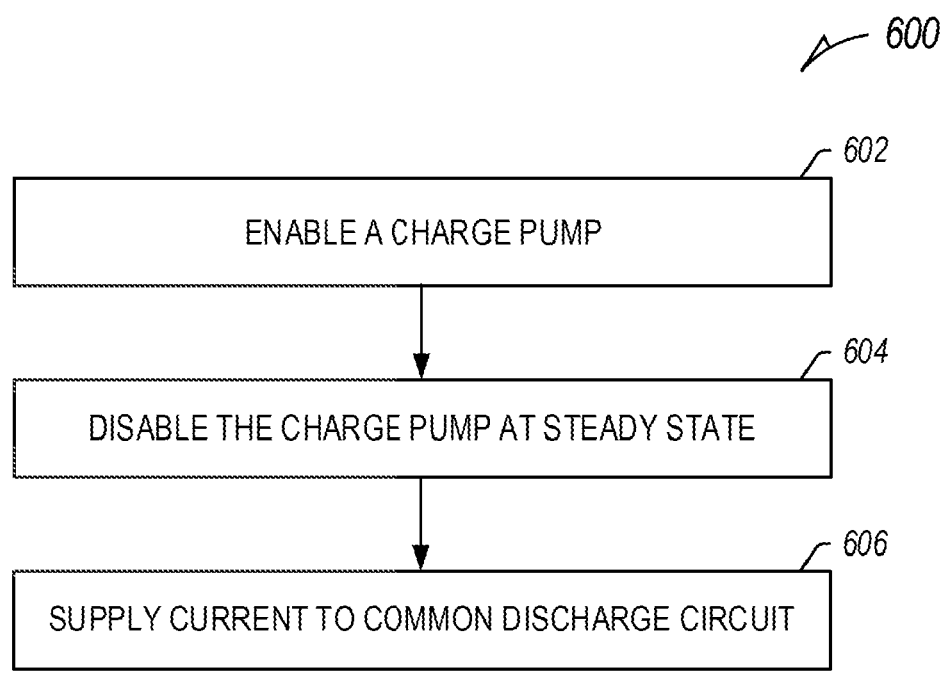
FIG. 6 illustrates an example method of discharging a charge pump.

FIG. 6 illustrates an example method 600 of operating a charge pump. At 602, a pumping function of the charge pump is selectively enabled. The charge pump includes multiple pump stages connected in series. The charge pump provides a high-voltage output under steady state operation. Each pump stage includes a capacitor node coupled to a capacitive element. Each pump stage also includes a low-voltage device that includes a dielectric layer having a threshold voltage. The threshold voltage can be the largest voltage that can be safely applied across the dielectric layer. The threshold voltage can be 3.6V, 4V, etc. Each pump stage also includes an output node coupled to the capacitor node through the low-voltage device.

At 604, the pumping function is selectively disabled. After disabling the charge pump, each of the pump stages retains a remaining charge. This remaining charge may interact with the components of the charge pump in unexpected way. For example, a voltage above the threshold voltage may be applied across the low-voltage devices and damage those devices. To avoid this, the remaining charge can be reduced to a safe level.

At 606, a current is supplied to the capacitor nodes of two or more of the multiple pump stages using the common discharge circuit between a reference voltage and the common node. The current is supplied when the pumping function of the charge pump is disabled. The current reduces charge from the two or more pump stages of the multiple pump stages through multiple high-voltage diodes that are coupled between the output node of a respective pump stage and the common node. The pump stages can be discharged such that the voltage across the pump stages is zero or a voltage that is below the threshold voltage. Keeping some charge across the pump stage enables the pump stage to reach steady state faster for additional operations than if the pump stages start at zero volts.

The amount of current provided by the current source controls the discharge speed of the charge pump. In an example, the larger the current supplied by the current source the faster the remaining current is flushed from the pump stages. As the current source can be trimmable, the amount of current provided is configurable. In an example, the amount of current provided by the trimmable current source is determined based on the remaining charging at the pump stages when the charge pump is disabled at steady state. For example, two charge pumps that produce different voltages at steady state may be configured to discharge over a same amount of time based on the current sources. This can be achieved even though the pump stages of the different charge pumps may have different remaining charges.

Figure 7:
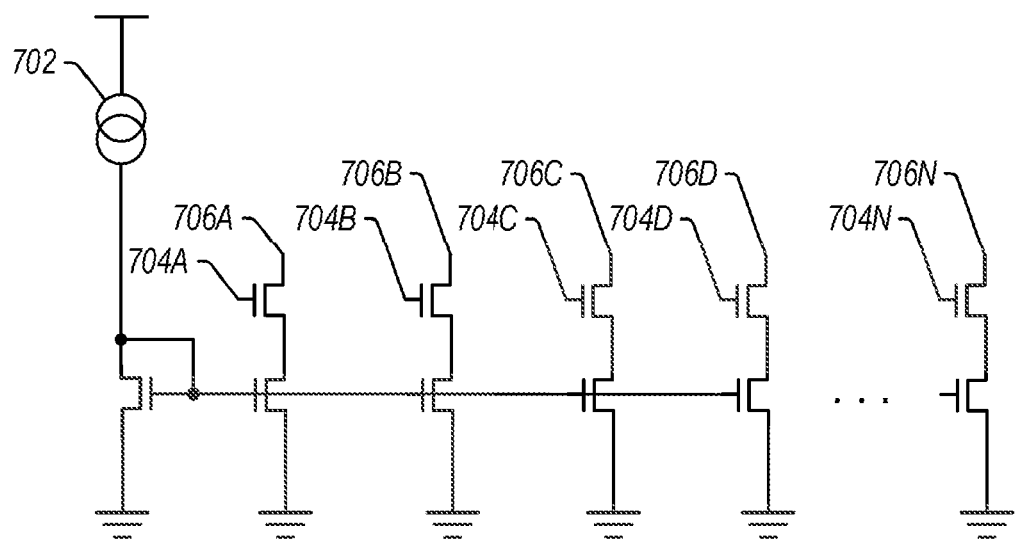
FIG. 7 illustrates an example current source.

FIG. 7 illustrates an example current source 700. In this example, the current source 700 is a current mirror. A reference current 702 is mirrored by the current mirror 700. Signals 704A-704N may be used on devices of the current mirror 700 to mirror the reference current 702. The signals 704A-704N allow the current mirror to be digitally programmed. Currents 706A-706N can be a multiple of the reference current 702. For example, current 706A may be equal to the reference current 702, current 706B may be equal to two times the reference current 702, current 706C may be equal to four times the reference current 702, current 706D may be equal to eight times the reference current 702, etc. The current source 700 may be used as the current source 220 in FIG. 2.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

This doesn't have any applicability to the current description that I can see.

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

Example 1 is a charge pump having a pumping function comprising: multiple pump stages connected in series, wherein each pump stage comprises: a capacitor node coupled to a capacitive element; a low-voltage device comprising a dielectric layer having a threshold voltage; and an output node coupled to the capacitor node through the low-voltage device; a common discharge circuit coupled between a reference voltage and a common node; and multiple high-voltage diodes, each coupled between the output node of a respective pump stage and the common node; wherein the common discharge circuit comprises a current source configured to supply a current to the output nodes when the pumping function of the charge pump is disabled.

In Example 2, the subject matter of Example 1 includes, wherein the current source controls a discharge speed of the charge pump.

In Example 3, the subject matter of Example 2 includes, wherein a current of the current source is based on a sum of charges of the multiple pump stages after the charge pump is disabled at steady state.

In Example 4, the subject matter of Examples 1-3 includes, wherein each of the pump stages is discharged to 0 volts when the charge pump is disabled.

In Example 5, the subject matter of Examples 1~4 includes, wherein each of the pump stages is discharged to a discharge voltage, wherein the discharge voltage is greater than 0 volts.

In Example 6, the subject matter of Example 5 includes, wherein the discharge voltage is less than the threshold voltage.

In Example 7, the subject matter of Examples 1-6 includes, wherein the high-voltage diodes do not pass current to the current source when the charge pump is enabled.

In Example 8, the subject matter of Examples 1-7 includes, wherein the low-voltage threshold is 4 volts.

Example 9 is a method for operating a charge pump, the method comprising: selectively enabling a pumping function of a charge pump comprising multiple pump stages connected in series providing a high-voltage output under steady state operation, wherein each pump stage includes: a capacitor node coupled to a capacitive element; a low-voltage device comprising a dielectric layer having a threshold voltage; and an output node coupled to the capacitor node through the low-voltage device; selectively disabling the pumping function of the charge pump; and supplying a current to the capacitor nodes of two or more of the multiple pump stages using a common discharge circuit coupled between a reference voltage and a common node when the pumping function of the charge pump is disabled, the current configured to reduce charge from the two or more pump stages of the multiple pump stages through multiple high-voltage diodes, each coupled between the output node of a respective pump stage and the common node.

In Example 10, the subject matter of Example 9 includes, wherein the current source controls a discharge speed of the charge pump.

In Example 11, the subject matter of Example 10 includes, wherein a current of the current source is based on a sum of charges of the n pump stages after the charge pump is disabled at the steady state.

In Example 12, the subject matter of Examples 9-11 includes, wherein the pump stages are discharged to 0 volts when the charge pump is disabled.

In Example 13, the subject matter of Examples 9-12 includes, wherein the pump stages are discharged to a discharge voltage, wherein the discharge voltage is greater than 0 volts.

In Example 14, the subject matter of Example 13 includes, wherein the discharge voltage is less than the threshold voltage.

Example 15 is a system of charge pumps each having a pumping function, the system comprising: a first charge pump having a first pumping function to generate a first voltage, the first charge pump comprising: first multiple pump stages connected in series, wherein each first pump stage comprises: a first capacitor node coupled to a capacitive element; a first low-voltage device comprising a first dielectric layer having a first threshold voltage; and a first output node coupled to the first capacitor node through first the low-voltage device; a first common discharge circuit coupled between a first reference voltage and a first common node; and first multiple high-voltage diodes, each coupled between the first output node of a respective first pump stage and the first common node; wherein the first common discharge circuit comprises a first current source configured to supply a first current to the first output nodes when the first pumping function of the first charge pump is disabled, wherein the first current is supplied for a period of time; and a second charge pump having a second pumping function to generate a second voltage, the second charge pump comprising: second multiple pump stages connected in series, wherein each second pump stage comprises: a second capacitor node coupled to a capacitive element; a second low-voltage device comprising a second dielectric layer having a second threshold voltage; and a second output node coupled to the second capacitor node through second the low-voltage device; a second common discharge circuit coupled between a second reference voltage and a second common node; and second multiple high-voltage diodes, each coupled between the second output node of a respective second pump stage and the second common node; wherein the second common discharge circuit comprises a second current source configured to supply a second current to the second output nodes when the second pumping function of the second charge pump is disabled, wherein the second current is supplied for the period of time.

In Example 16, the subject matter of Example 15 includes, wherein the first current source controls a discharge speed of the first charge pump, and wherein the second current source controls a discharge speed of the second charge pump.

In Example 17, the subject matter of Example 16 includes, wherein a current of the first current source is based on a sum of charges of the first multiple pump stages after the first charge pump is disabled at steady state.

In Example 18, the subject matter of Examples 15-17 includes, wherein the first current source is connected to a ground, and each of the first multiple pump stages are discharged to 0 volts when the first charge pump is disabled.

In Example 19, the subject matter of Examples 15-18 includes, wherein each of the multiple first pump stages are discharged to a discharge voltage, wherein the discharge voltage is greater than 0 volts and less than the first threshold voltage.

In Example 20, the subject matter of Examples 15-19 includes, wherein the first high-voltage diodes do not pass current to the first current source when the first charge pump is enabled.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20. Example 24 is a Method to Implement of any of Examples 1-20.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A high-voltage charge pump, comprising:
multiple pump stages connected in series to provide a high-voltage output, each of the multiple pump stages comprising a low-voltage switching device; and
a common discharge circuit coupled to each of the multiple pump stages, the common discharge circuit comprising a current source configured to supply a current to each of the multiple pump stages to discharge remaining stored charge of the multiple pump stages when the multiple pump stages are disabled,
wherein the current of the common discharge circuit is dependent on the remaining stored charge of the multiple pump stages.

2. The high-voltage charge pump of claim 1,
wherein the multiple pump stages comprise a number of pump stages connected in series to provide the high-voltage output, and
wherein the number of pump stages depends on a voltage level of the high-voltage output.

3. The high-voltage charge pump of claim 1,
wherein the multiple pump stages comprise multiple low-voltage pump stages connected in series, each low-voltage pump stage comprising a low-voltage device comprising a dielectric layer having a threshold voltage, and
wherein the current source is configured to supply the current to the output of each of the multiple pump stages when the pumping function of the charge pump is disabled.

4. The high-voltage charge pump of claim 3,
wherein the threshold voltage of dielectric layer of the low-voltage device is 4 volts or less.

5. The high-voltage charge pump of claim 1,
wherein each of the multiple pump stages comprise:
a capacitor node coupled to a capacitive element;
a low-voltage switching device comprising a dielectric layer having a threshold voltage; and
an output node coupled to the capacitor node through the low-voltage switching device,
wherein the common discharge circuit comprises the current source, and
wherein to discharge the multiple pump stages when the multiple pump stages are disabled, the current source is configured to supply a current to the output nodes when the pumping function of the charge pump is disabled.

6. The high-voltage charge pump of claim 5, comprising:
multiple diodes, the multiple diodes including, for each of the multiple pump stages, a respective diode coupled between the capacitor node of a respective pump stage and the output node of the respective pump stage.

7. The high-voltage charge pump of claim 5,
wherein the current source controls a discharge speed of the charge pump, and
wherein a current of the current source is based on a sum of charges of the multiple pump stages after the charge pump is disabled at steady state.

8. The high-voltage charge pump of claim 1,
wherein each of the multiple pump stages are discharged to 0 volts when the charge pump is disabled.

9. The high-voltage charge pump of claim 1,
wherein each of the multiple pump stages are discharged to a discharge voltage, and
wherein the discharge voltage is greater than 0 volts.

10. The high-voltage charge pump of claim 9,
wherein the multiple pump stages comprise multiple low-voltage pump stages connected in series, each low-voltage pump stage comprising a low-voltage device comprising a dielectric layer having a threshold voltage, and
wherein the discharge voltage is less than the threshold voltage.

11. The high-voltage charge pump of claim 1, comprising:
multiple high-voltage devices, including a respective high-voltage device coupled between an output of each of the multiple pump stages and the common discharge circuit.

12. The high-voltage charge pump of claim 11,
wherein the multiple pump stages comprise a first pump stage and a second pump stage,
wherein the multiple high-voltage devices comprise multiple high-voltage diodes, including a first high-voltage diode and a second high-voltage diode,
wherein the respective high-voltage device comprises the first high-voltage diode coupled between an output of the first pump stage and the common discharge circuit,
wherein the second high-voltage diode is coupled between an output of the second pump stage and the common discharge circuit, and
wherein the multiple high-voltage diodes do not pass current to the common discharge circuit when the multiple pump stages are enabled.

13. A method for operating a high-voltage charge pump, the method comprising:
selectively enabling a pumping function of a high-voltage charge pump comprising multiple pump stages connected in series to provide a high-voltage output using stored charge of the multiple pump stages, each of the multiple pump stages comprising a low-voltage switching device; and
supplying an amount of current to each of the multiple pump stages to discharge remaining stored charge of the multiple pump stages when the multiple pump stages are disabled using a common discharge circuit coupled to each of the multiple pump stages, the common discharge circuit comprising a current source, wherein the amount of current of the common discharge circuit supplied to discharge the remaining stored charge of the multiple pump stages when the multiple pump stages are disabled is dependent on the remaining stored charge of the multiple pump stages, wherein the current of the common discharge circuit supplied to the multiple pump stages when the multiple pump stages are disabled is dependent on remaining stored charge of the multiple pump stages.

14. The method of claim 13, wherein the multiple pump stages comprise a number of pump stages connected in series to provide the high-voltage output, and wherein the number of pump stages depends on a voltage level of the high-voltage output.

15. The method of claim 13, wherein supplying the current to the output of each of the multiple pump stages comprises when the pumping function of the charge pump is disabled, wherein the multiple pump stages comprise multiple low-voltage pump stages connected in series, each low-voltage pump stage comprising a low-voltage device comprising a dielectric layer having a threshold voltage, and wherein the threshold voltage of dielectric layer of the low-voltage device is 4 volts or less.

16. The method of claim 13, wherein each of the multiple pump stages comprise:

a capacitor node coupled to a capacitive element;

a low-voltage switching device comprising a dielectric layer having a threshold voltage; and an output node coupled to the capacitor node through the low-voltage switching device, and wherein supplying the current to each of the multiple pump stages to discharge the multiple pump stages comprises supplying a current to the output nodes using the current source of the common discharge circuit when the pumping function of the charge pump is disabled.

17. The method of claim 13, comprising:

controlling a discharge speed of the charge pump using the current source, wherein a current of the current source is based on a sum of charges of the multiple pump stages after the charge pump is disabled at steady state.

18. The method of claim 13, wherein supplying the current to each of the multiple pump stages to discharge the multiple pump stages comprises discharging each of the multiple pump stages to 0 volts when the charge pump is disabled.

19. The method of claim 13, wherein supplying the current to each of the multiple pump stages to discharge the multiple pump stages comprises discharging each of the multiple pump stages to a discharge voltage, and wherein the discharge voltage is greater than 0 volts.

20. The method of claim 13, wherein the multiple pump stages comprise multiple low-voltage pump stages connected in series, each low-voltage pump stage comprising a low-voltage device comprising a dielectric layer having a threshold voltage, and wherein the discharge voltage is less than the threshold voltage.

21. The high-voltage charge pump of claim 1, wherein the multiple pump stages provide the high-voltage output using a stored charge, wherein the current source of the common discharge circuit is configured to supply an amount of current to the multiple pump stages to discharge the remaining stored charge of the multiple pump stages when the multiple pump stages are disabled, and wherein the amount of current of the common discharge circuit supplied to discharge the remaining stored charge of the multiple pump stages when the multiple pump stages are disabled is dependent on remaining stored charge of the multiple pump stages.

* * * * *